(12) United States Patent
Vigier et al.

(10) Patent No.: US 7,074,518 B2
(45) Date of Patent: Jul. 11, 2006

(54) ELECTROCHEMICAL BATTERY HAVING A SURFACE OF REVOLUTION

(75) Inventors: Nicolas Vigier, Ruffec (FR); Stéphane Besse, Touvre (FR)

(73) Assignee: Saft Finance S.AR.L., Luxembourg (LU)

( * ) Notice: Subject to any disclaimer, the term of this patent is extended or adjusted under 35 U.S.C. 154(b) by 511 days.

(21) Appl. No.: 10/419,821

(22) Filed: Apr. 22, 2003

(65) Prior Publication Data
US 2003/0198864 A1    Oct. 23, 2003

(30) Foreign Application Priority Data
Apr. 23, 2002    (FR)    ................... 02 05090

(51) Int. Cl.
*H01M 2/12* (2006.01)
(52) U.S. Cl. ................ 429/71; 429/82; 429/149; 429/156
(58) Field of Classification Search ............ 429/71
See application file for complete search history.

(56) References Cited
U.S. PATENT DOCUMENTS
5,721,064 A * 2/1998 Pedicini et al. ............ 429/27
6,428,925 B1 * 8/2002 Takeno et al. ............ 429/163

FOREIGN PATENT DOCUMENTS
EP    1035599 A1    9/2000
FR    2745422    8/1997

OTHER PUBLICATIONS

Patent Abstracts of Japan, vol. 007, No. 284 (E-217) Dec. 17, 1983 corresponding to JP 58 161272 A (Mitsubishi Denki KK) dated Sep. 24, 1983.
Patent Abstracts of Japan, vol. 2000, No. 24, May 11, 2001, corresponding to JP 2001 185240 A (Honda Motor Col. Ltd.) dated Jul. 6, 2001.

* cited by examiner

*Primary Examiner*—Michael Barr
*Assistant Examiner*—Tony Chuo
(74) *Attorney, Agent, or Firm*—Sughrue Mion, PLLC

(57) ABSTRACT

An electrochemical battery comprises a casing (1) presenting a surface of revolution about an axis, having at least one air inlet opening (4) and at least one air outlet opening (5), and housing firstly in a central portion (6), fan means (7), and secondly around the periphery of the central portion, secondary electrochemical cells (8) arranged in such a manner as to deliver selected electrical characteristics. The air flow generated by the axial fan means (7) between the air inlet opening (4) and the air outlet opening (5) sweep over the cells (8), thereby regulating their temperature.

11 Claims, 2 Drawing Sheets

ELECTROCHEMICAL BATTERY HAVING A SURFACE OF REVOLUTION

The invention relates to the field of electrical batteries, and more particularly to that of secondary electrochemical cells, better known as rechargeable batteries.

BACKGROUND OF THE INVENTION

In certain fields, such as automobiles, electrical power supply for certain devices is provided at least in part by means of rechargeable batteries constituted by electrochemical cells of number and method of assembly that are functions of the required electrical characteristics. The space available for a battery within an installation or a vehicle, and the electrical characteristics required vary from one configuration to another, so it is generally necessary to devise a battery architecture that is specific for each configuration, thus contributing in particular to increasing manufacturing cost and design times for such batteries.

In an attempt to remedy that drawback, battery blocks have been proposed in the form of rectangular parallelepipeds (or prisms) in which cells are grouped together, e.g. in threes, so as to constitute "sticks" that are used in numbers that vary depending on requirements, such blocks subsequently being assembled together in casings of prismatic shape to channel flows of air. However, that solution is unsatisfactory insofar as firstly it does not enable the ratio of battery volume over the number of cells required to be optimized, and secondly it does not enable temperature to be regulated between the various cells in sufficiently uniform manner. In addition, the type of ventilation required by the battery architecture is limited in terms of performance and noise level.

OBJECTS AND SUMMARY OF THE INVENTION

An object of the invention is thus to remedy the above-mentioned drawbacks in full or in part.

To this end, the invention provides an electrochemical battery comprising a casing having at least one air inlet opening and at least one air outlet opening, and housing in a central portion fan means, and at the periphery of said central portion, secondary electrochemical cells (e.g. nickel metal hydride (Ni/MH) cells) arranged in such a manner as to deliver the desired electrical characteristics. As a result, a compact battery is obtained in which the ratio of volume occupied over number of cells required can be optimized as a function of requirements and in which temperature regulation of the cells can be controlled effectively by the air flow generated by the axial fan means between the inlet and outlet openings.

According to another characteristic of the invention, the casing presents a surface of revolution around an axis of revolution, and the fan means are received in the central portion of the casing, lying substantially on the axis of revolution (X), or in the vicinity thereof. The term "surface of revolution" is used to mean the surface defined by the walls of the casing around the axis X.

The casing is preferably substantially in the form of a circular cylinder.

Also preferably, the cells are preferably in the form of substantially circular cylinders.

According to another characteristic of the invention, the casing may contain a plurality (at least two) part-annular compartments that are preferably removable, the compartments being defined by walls, one of which has openings providing access for the air flow in the central portion, and said compartments containing the cells. Depending on requirements, the cells in a compartment may be connected together in series with the cells of an adjacent compartment, or it is possible to define branches, each of at least three compartments connected in series, with said branches themselves being connected together either in series or in parallel.

In order to make the battery easier to assemble, the casing preferably comprises two shells suitable for being assembled together in order to house and protect the cells and the fan means, the shells respectively including the inlet opening and the outlet opening.

Furthermore, the fan means are preferably selected from the group comprising axial fans and centrifugal blowers.

The battery of the invention is particularly, but not exclusively, adapted to motor vehicles, and in particular to occupying the position previously occupied by the spare wheel.

BRIEF DESCRIPTION OF THE DRAWINGS

Other characteristics and advantages of the invention appear on examining the following detailed description and the accompanying drawings, in which.

MORE DETAILED DESCRIPTION

The accompanying drawings are, for the most part, definitive in character. Consequently, not only do they contribute to describing the invention, but they may also contribute to defining it, where appropriate.

Figure 1:
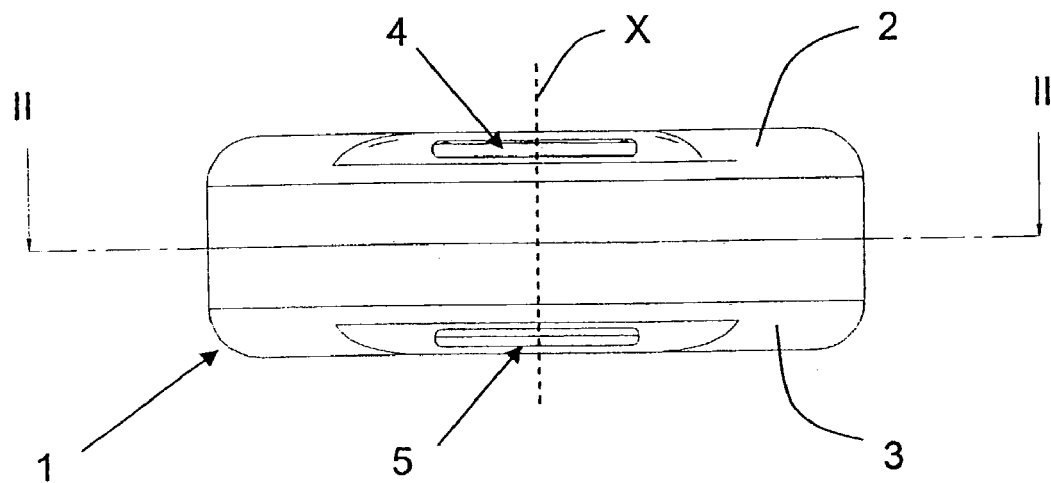
FIG. 1 shows an electrochemical battery of the invention.
Figure 2:
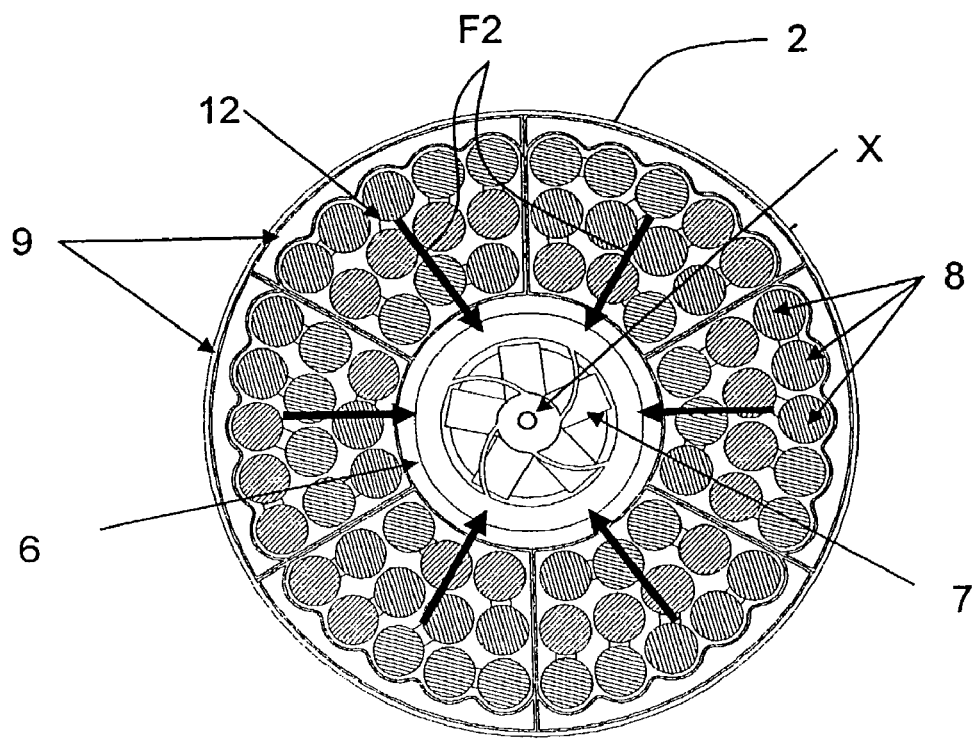
FIG. 2 is a section view on line II—II of FIG. 1.
Figure 3:
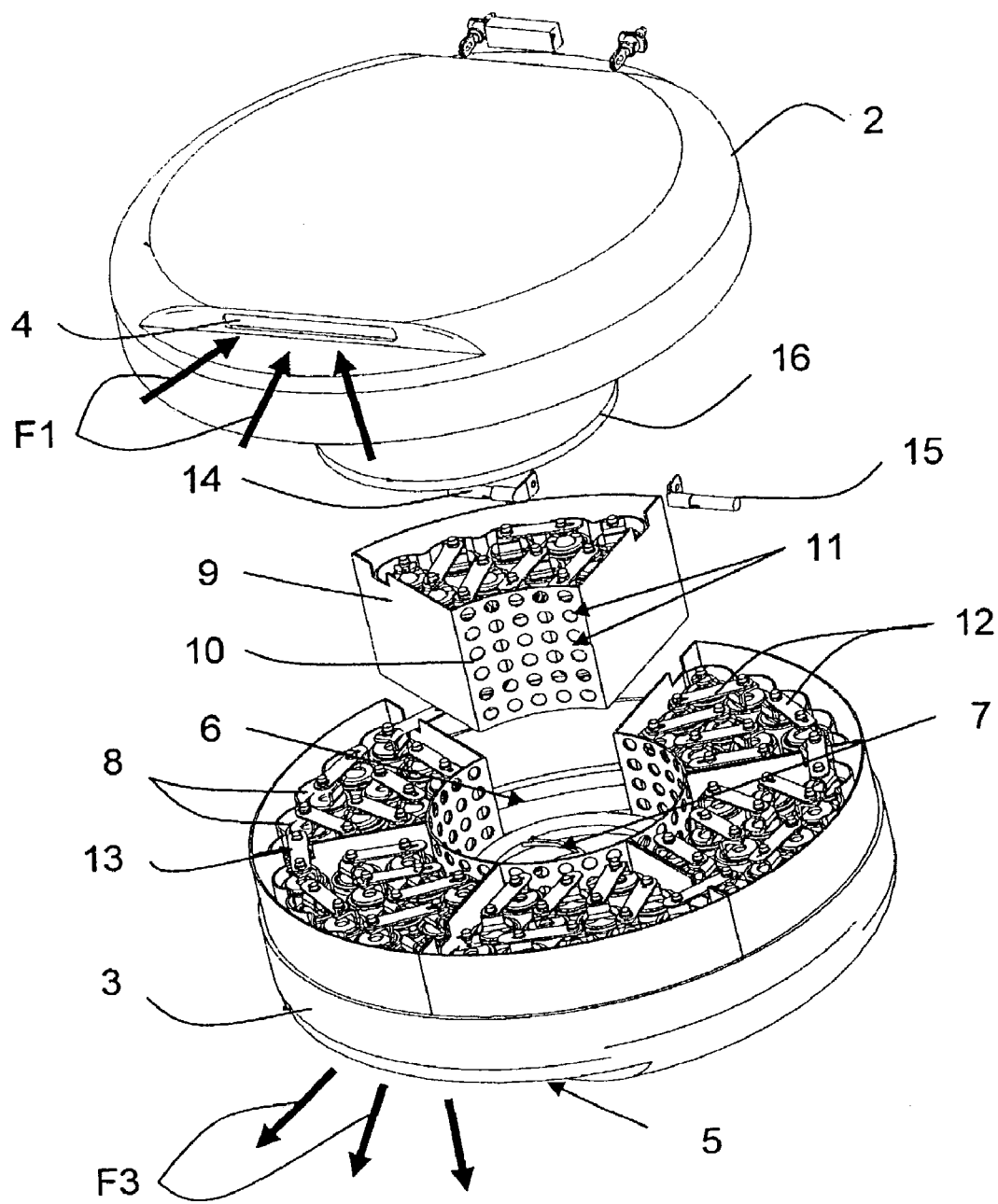
FIG. 3 is an exploded perspective view of the FIG. 1 battery.

The secondary or "rechargeable" electrochemical battery shown in FIGS. 1 to 3 comprises firstly a casing 1 whose walls preferably define substantially a surface of revolution about an axis of revolution X. More precisely, in this embodiment, the casing 1 is substantially in the form of a circular cylinder, said axis of revolution X being the axis of the cylinder.

In this case, the casing 1 is made in the form of two complementary receptacles or "shells" 2 and 3.

The "top" shell 2 includes at least one air inlet opening 4, preferably in a peripheral region thereof. Similarly, the "bottom" shell 3 includes at least one air outlet opening 5, preferably implemented in a peripheral region thereof.

The terms "top" and "bottom" are used herein to make it easier to describe the battery. They do no more than specify the respective positions of the shells 2 and 3 in the figures, and they do not define their positions once installed in an installation or a motor vehicle, for example.

The casing 1 has a central portion 6 in which there are installed, substantially on the axis X or in the vicinity thereof, fan means 7 for using a flow of air to regulate the temperature in air of electrochemical cells 8 described below. The fan means 7 are preferably implemented in the form of a centrifugal blower. Naturally, instead of using a centrifugal blower, it is possible to use an axial type fan, the axis of rotation of the fan then coinciding substantially with the axis X of the cylinder.

Around the central portion 6, and consequently around the centrifugal blower 7, there are installed secondary electrochemical cells 8, e.g. of the nickel metal hydride (Ni/MH), nickel cadmium (Ni/Cd), lithium ion (Li/Ion), or similar type. In the example shown in FIGS. 2 and 3, the cells 8 are in the form of circular cylinders and they are received in compartments 9 (or baskets) each having the shape of a fraction of a ring (i.e. they are part-annular in shape), the compartments surrounding the central portion 6. These baskets 9 are defined by side walls, at least one of which includes openings 11 to allow a flow of air to pass from the inside of the basket 9 to the central portion 6 containing the blower 7. In the example shown, the openings 11 are in the wall 10 that faces the central portion 6. The rear portion of the basket and/or at least one of the top and bottom portions may also include openings through which air can pass.

Naturally, it would also be possible to provide openings 11 in the side walls of the baskets 9 so as to allow air to flow from one basket 9 to another.

The circularly cylindrical shape of the cells 8 is preferred in this case insofar as it makes it possible to optimize occupation of the space available in the baskets 9.

In the example shown, which is particularly well adapted to the space that used to be provided for a spare wheel, the casing 1 houses six baskets 9 each of which contains twelve cells 8. The connections between the cells 8 in a given basket 9 and the connections between cells in adjacent baskets depend on the desired electrical characteristics. For example, as shown in FIG. 3, the cells 8 in a basket 9 may be connected in series using conductor straps 12 connecting the positive pole of one cell to the negative pole of another, and the baskets 9 can be connected likewise in series using conductor straps 13 connecting the positive (or negative) pole of the last cell 8 in one basket 9 to the negative (or positive) pole of the first cell 8 in the adjacent basket 9. In this example, the baskets 9 are connected in series to define a branch capable of delivering a voltage of about 42 volts (V) for example between its connection terminals 14 and 15.

Numerous other configurations could be envisaged. For example, still using six baskets 9, it is possible to set up two parallel branches of three baskets connected in series (with their cells 8 likewise being connected in series) so as to deliver higher electrical power, typically of the order of 22 kilowatts (kW). It is also possible to provide baskets 9 in which the cells are grouped together in pairs (for example), with the positive (or negative) poles of the cells in each pair being coupled together by means of a conductor strap 12, and with the negative (or positive) poles of the cells in question each being coupled to the negative (or positive) pole of a cell in another pair by means of respective conductor straps 12.

It is also possible to connect cells in a plurality of formats in order to cover an entire range of posers.

Naturally, the number of baskets 9, the number of cells 8 in each basket, the dimensions of the cells, and the dimensions of the casing 1 are functions of the required electrical characteristics and of the available volume. Thus, instead of having a plurality of baskets, it would be possible to provide only one, or even to provide no basket at all.

The casing 1 also houses a control module 16, preferably of substantially circular shape or in the shape of an optionally truncated cone so as to close off the top end of the central portion 6 of the casing and constrain the flow of air to pass between the cells 8 (in the baskets 9) in order to cool them and then to the fan system in order to be expelled from the battery. The module 16 serves to control operation of the battery. More precisely, it preferably manages temperatures within the battery, authorizations to deliver electrical power, to recharge the battery, and also to deliver power to the blower 7, thus making it possible to control air temperatures within the casing 1.

The above-described battery is particularly simple to assemble. Initially, the cells 8 for each basket 9 are assembled together using the conductor straps 12 so as to make up groups of cells (e.g. each comprising twelve cells), after which each group of cells 8 is put into place in a basket 9. Thereafter, the baskets 9 are put into the bottom shell 3 around the periphery of the central portion 6, after the blower 7 has been installed in said central portion 6. Thereafter, the cells 8 are connected either to cells in adjacent baskets 9, using conductor straps 13, or to the connection terminals 14 and 15 of the battery, and the control module 16 is put into place on top of the central portion 6. All that then remains to be done is to place the top shell 2 over the bottom shell 3 and to interconnect them, e.g. by fastener means of the nut and bolt type or the clamping ring type, or indeed by means of clips or by interfitting shapes.

Once the battery has been assembled, outside air is sucked in by the blower 7 through the inlet opening 4 (as shown by arrows F1 in FIG. 3), flows through the various baskets 9, sweeping in substantially uniform manner over the various cells 8, penetrating into the central portion 6 via the openings 11 (as shown by arrows F2 in FIG. 2), before finally being expelled from the casing 1 by the blower 7 via the outlet opening 5 in the bottom shell 3 (as shown by arrows F3 in FIG. 3).

In order to enable air flow to be well distributed within the various baskets 9, the top shell 2 and/or the control module 16 may include shaped guide ribs.

Because of its circularly cylindrical shape, the above-described battery is particularly well adapted to motor vehicles, and in particular to the spaces that used to be occupied by spare wheels. Naturally, other shapes, in particular circularly symmetrical shapes can be envisaged, for example cone shapes. Such a circularly symmetrical shape enables the battery to be adapted to a wide range of configurations, both in terms of where the air inlet and outlet openings are positioned and in terms of connection interfacing.

The invention thus provides a battery of original architecture that provides a high level of adaptability, both in terms of electrical characteristics and in terms of space occupied, and above all it makes it possible to control air temperature inside the casing of the battery with accuracy, and thus provide effective and uniform regulation of the temperature of the electrochemical cells.

The invention is not limited to the embodiments described above merely by way of example, and it covers any variant that might be envisaged by the person skilled in the art in the ambit of the following claims.

Thus, a casing is described above having one air inlet opening and one air outlet opening. However it is possible to envisage a casing having a plurality of air inlet openings and/or a plurality of air outlet openings.

Furthermore, with reference to the figures, a casing is described above that is in the form of a body of revolution (a circular cylinder). However, the casing could have any other shape providing it enables a central portion to be defined for receiving the fan means, and a peripheral portion surrounding the central portion for receiving the cells of the battery. Consequently, the walls of the casing could present one or more projections, e.g. radial projections, for housing additional components and/or other battery cells.

Furthermore, the description given with reference to the figures relates to cells that are themselves bodies of revolution (circular cylinders). However, the cells could be of any other shape providing they are of a shape that is suitable for optimizing the space available inside the casing around the fan means.

Because of the way they are assembled together, the cells can easily be replaced by cells of some other height or even of some other format. This makes it possible to obtain batteries of different powers.

Furthermore, the description above relates to a battery delivering a single power. However, the battery could contain at least two independent groups of cells delivering in parallel powers that are identical or different. For example, at the periphery of the fan means, the casing could contain three baskets, connected in series so as to deliver a first power under a first voltage, and three other baskets likewise connected in series so as to deliver a second power (identical to or different from the first) under a second voltage (identical to or different from the first).

What is claimed is:

1. An electrochemical battery comprising:
   a casing having top, bottom and peripheral walls defining a surface of revolution about an axis X;
   a fan arranged in a central portion of the casing;
   at least one air inlet opening and at least one air outlet opening in said casing, and
   secondary electrochemical cells arranged annularly around the central portion and housed in a compartment provided with openings facing the central portion.

2. A battery according to claim 1, wherein said casing is substantially in the form of a circular cylinder.

3. A battery according to claim 1, wherein said cells are substantially in the form of circular cylinders.

4. A battery according to claim 1, wherein said casing has at least two part-annular compartments receiving said cells, each compartment having a top, a bottom, an inner wall facing the central portion and an outer wall facing the casing peripheral walls, at least the inner wall being provided with openings.

5. A battery according to claim 4, wherein the cells of a compartment are coupled in series with the cells of the adjacent compartment.

6. A battery according to claim 4, wherein the battery has at least three compartments connected in series and defining a branch.

7. A battery according to claim 6, wherein the battery comprises at least two branches connected in parallel, each branch being constituted by at least one compartment of cells.

8. A battery according to claim 7, wherein said branches are mutually independent.

9. A battery according to claim 1, wherein said cells are secondary cells selected from the group consisting of nickel metal hydride cells, nickel cadmium cells (Ni/Cd) and lithium ion cells (Li/Ion).

10. A battery according to claim 1, wherein said casing comprises first and second shells assembled together to receive said cells and fan, said first and second shells respectively including said air inlet and said air outlet openings.

11. A battery according to claim 1, wherein said fan is selected from the group consisting of axial fans and centrifugal blowers.

* * * * *